(12) United States Patent
Inoue et al.

(10) Patent No.: US 12,174,635 B2
(45) Date of Patent: Dec. 24, 2024

(54) INFORMATION PROCESSING APPARATUS, INFORMATION PROCESSING METHOD, AND NON-TRANSITORY STORAGE MEDIUM STORING PROGRAM FOR GENERATING ROUTE BASED ON EVENT AND A DEPOSIT POINT OF A BAGGAGE OR A PICK-UP POINT OF THE BAGGAGE

(71) Applicant: TOYOTA JIDOSHA KABUSHIKI KAISHA, Toyota (JP)

(72) Inventors: Kazuyuki Inoue, Nagoya (JP); Yurika Tanaka, Yokosuka (JP); Satoshi Komamine, Nagoya (JP); Go Tanaka, Toyota (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 17/950,238

(22) Filed: Sep. 22, 2022

(65) Prior Publication Data
US 2023/0097830 A1 Mar. 30, 2023

(30) Foreign Application Priority Data
Sep. 29, 2021 (JP) ................. 2021-159082

(51) Int. Cl.
*G01C 21/34* (2006.01)
*G05D 1/00* (2006.01)
(Continued)

(52) U.S. Cl.
CPC ....... *G05D 1/0217* (2013.01); *G01C 21/3415* (2013.01); *G06Q 10/20* (2013.01);
(Continued)

(58) Field of Classification Search
CPC .... G01C 21/3415; G01C 21/26; G06Q 10/20; G06Q 10/08355
See application file for complete search history.

(56) References Cited

U.S. PATENT DOCUMENTS 8,742,926 B2 * 6/2014 Schnittman ............... A47L 9/19
15/319
10,563,990 B1 * 2/2020 Gupta .................... G06Q 10/08
(Continued)

FOREIGN PATENT DOCUMENTS

JP 2011-122926 A 6/2011
JP 2016-45665 A 4/2016
(Continued)

*Primary Examiner* — Dino Kujundzic
(74) *Attorney, Agent, or Firm* — Oliff PLC

(57) ABSTRACT

An abnormality is more quickly resolved when the abnormality occurs in a storage device. An information processing apparatus is provided which includes a controller configured to control a vehicle with the storage device mounted thereon in which a user is able to deposit or pick up baggage, wherein the controller generates a route for the vehicle before an occurrence of a predetermined event so that the route passes through a deposit point of the baggage or a pick-up point of the baggage and a predetermined area including a predetermined location where the predetermined event is able to be resolved if the predetermined event related to storage of the baggage occurs in the storage device.

18 Claims, 16 Drawing Sheets

(51) Int. Cl.
  *G06Q 10/20* (2023.01)
  *G06Q 30/0207* (2023.01)
  *G01C 21/26* (2006.01)
  *G06Q 10/0835* (2023.01)

(52) U.S. Cl.
  CPC ......... *G06Q 30/0207* (2013.01); *G01C 21/26* (2013.01); *G06Q 10/08355* (2013.01)

(56) References Cited

U.S. PATENT DOCUMENTS

| | | | |
|---|---|---|---|
| 10,730,539 B2* | 8/2020 | Meyer | B61L 27/12 |
| 11,199,416 B2* | 12/2021 | Wilczynski | G01C 21/3453 |
| 2017/0059337 A1* | 3/2017 | Barker | G06Q 10/047 |
| 2017/0262790 A1* | 9/2017 | Khasis | G08G 1/012 |
| 2018/0023968 A1* | 1/2018 | Stuchfield | G01C 21/3453 |
| | | | 701/416 |
| 2018/0188065 A1* | 7/2018 | Brooks | G01C 21/3667 |
| 2018/0251126 A1* | 9/2018 | Linscott | G05D 1/0272 |
| 2020/0208998 A1* | 7/2020 | Xiang | G06F 16/29 |
| 2020/0218281 A1 | 7/2020 | Ono | |
| 2022/0073062 A1* | 3/2022 | Gariepy | B60W 30/182 |
| 2022/0404155 A1* | 12/2022 | Hausmann | G01C 21/3461 |
| 2024/0069567 A1 | 2/2024 | Ono | |

FOREIGN PATENT DOCUMENTS

| | | |
|---|---|---|
| JP | 2021-33732 A | 3/2021 |
| WO | 2019/039014 A1 | 2/2019 |

\* cited by examiner

| VEHICLE ID | CURRENT LOCATION | STATUS | ROUTE |
|---|---|---|---|
| V001 | x x x | x x x | x x x |
| V002 | x x x | x x x | x x x |
| V003 | x x x | x x x | x x x |
| . . . | . . . | . . . | . . . |

Fig. 5

| CLEANING PLACE ID | LOCATION | AVAILABLE TIME | AVAILABILITY LEVEL |
|---|---|---|---|
| × × × | × × × | DAILY 10:00–12:00 | 2 |
| × × × | × × × | WEEKDAYS 8:00–17:00 | 2 |
| × × × | × × × | 24 HOURS DAILY | 3 |
| . . . | . . . | . . . | . . . |

Fig. 7

INFORMATION PROCESSING APPARATUS, INFORMATION PROCESSING METHOD, AND NON-TRANSITORY STORAGE MEDIUM STORING PROGRAM FOR GENERATING ROUTE BASED ON EVENT AND A DEPOSIT POINT OF A BAGGAGE OR A PICK-UP POINT OF THE BAGGAGE

CROSS REFERENCE TO THE RELATED APPLICATION

This application claims the benefit of Japanese Patent Application No. 2021-159082, filed on Sep. 29, 2021, which is hereby incorporated by reference herein in its entirety.

BACKGROUND

Technical Field

The present disclosure relates to an information processing apparatus, an information processing method, and a non-transitory storage medium storing a program.

Description of the Related Art

There has been known a technique in which an odor sensor is provided in a locker and an output from the odor sensor is used to inspect the possibility that baggage may be a putrefactive substance, a deleterious substance, or the like (see, for example, Patent Literature 1). There has also been known a technique in which a gas sensor for detecting an odor is provided in a storage delivery box, so that it is determined that an abnormality has occurred when a detection value of the sensor exceeds a predetermined threshold value (see, for example, Patent Literature 2).

CITATION LIST

Patent Literature

Patent Literature 1: Japanese Patent Application Laid-Open Publication No. 2021-033732
Patent Literature 2: Japanese Patent Application Laid-Open Publication No. 2016-045665

SUMMARY

Any odor or dirt left in the locker can make the locker unusable or uncomfortable for the next user. The object of the present disclosure is to more quickly resolve an abnormality when the abnormality occurs in a storage device.

One aspect of the present disclosure is directed to an information processing apparatus including a controller configured to control a vehicle with a storage device mounted thereon in which a user is able to deposit baggage, wherein
the controller generates a route for the vehicle before an occurrence of a predetermined event so that the route passes through a deposit point of the baggage or a pick-up point of the baggage and a predetermined area including a predetermined location where the predetermined event is able to be resolved if the predetermined event related to storage of the baggage occurs in the storage device.

Another aspect of the present disclosure is directed to an information processing method for controlling, by a computer, a vehicle with a storage device mounted thereon in which a user is able to deposit baggage, wherein
the computer generates a route for the vehicle before an occurrence of a predetermined event so that the route passes through a deposit point of the baggage or a pick-up point of the baggage and a predetermined area including a predetermined location where the predetermined event is able to be resolved if the predetermined event related to storage of the baggage occurs in the storage device.

A further aspect of the present disclosure is directed to a non-transitory storage medium storing a program configured to control a vehicle with a storage device mounted thereon in which a user is able to deposit baggage, wherein
the program causes a computer to generate a route for the vehicle before an occurrence of a predetermined event so that the route passes through a deposit point of the baggage or a pick-up point of the baggage and a predetermined area including a predetermined location where the predetermined event is able to be resolved if the predetermined event related to storage of the baggage occurs in the storage device.

In addition, a still further aspect of the present disclosure is directed to the program described above.

According to the present disclosure, when an abnormality occurs in a storage device, it is possible to resolve the abnormality more quickly.

BRIEF DESCRIPTION OF THE DRAWINGS

FIG. 5 is a view illustrating an example of a table configuration of a vehicle information DB;
FIG. 7 is a view illustrating an example of a table configuration of a cleaning place information DB.

DESCRIPTION OF THE EMBODIMENTS

Figure 1:
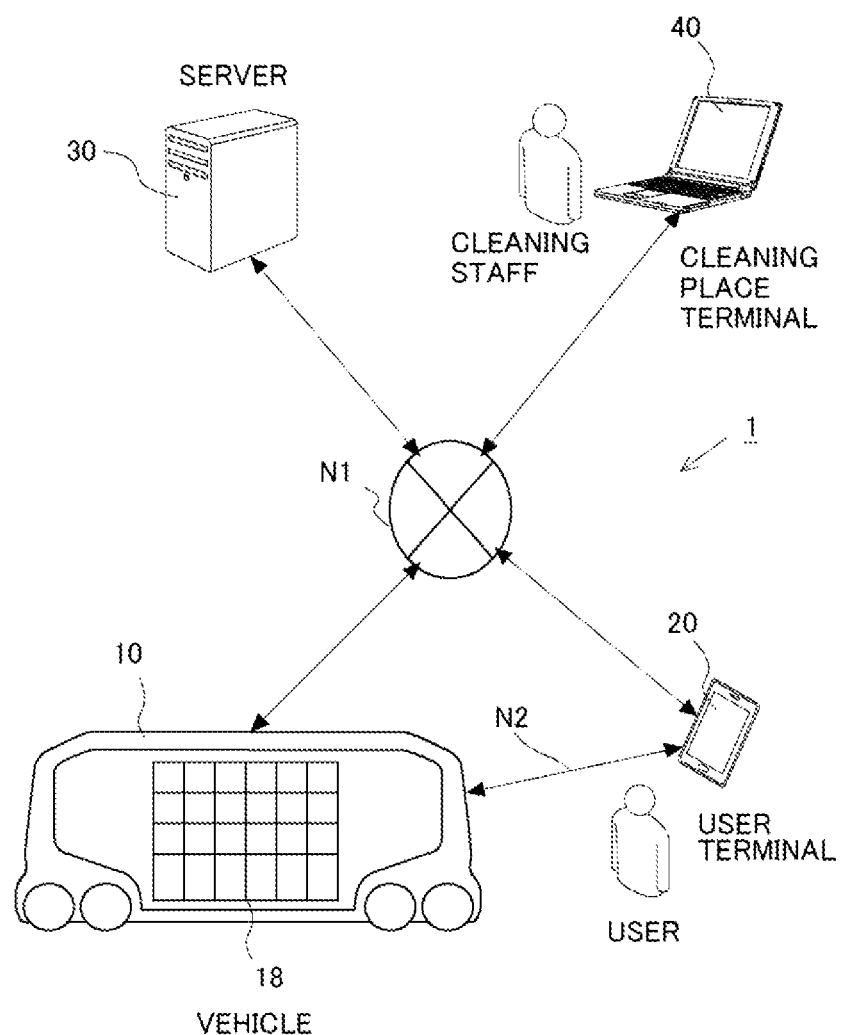
FIG. 1 is a view illustrating a schematic configuration of a system according to an embodiment.

An information processing apparatus, which is one aspect of the present disclosure, includes a controller. The controller controls a vehicle with a storage device mounted thereon in which a user is able to deposit his or her baggage (luggage). The storage device, which is mounted on the vehicle, moves together with the movement or travel of the vehicle. Therefore, the user can call the storage device together with the vehicle when depositing or picking up the baggage. Therefore, the user does not have to travel a long distance when depositing or picking up the baggage.

In addition, the controller generates a route for the vehicle before an occurrence of a predetermined event so that the route passes through a deposit point of the baggage or a pick-up point of the baggage and a predetermined area including a predetermined location where the predetermined event is able to be resolved if the predetermined event related to storage of the baggage occurs in the storage device. The predetermined event is, for example, an event that affects the deposited baggage or an event that affects the user who deposited the baggage. For example, the baggage may be odorous, the baggage may be dirty, the baggage may be wet, the user may feel the order unpleasant, or the user may feel the dirt unpleasant. For example, liquid may spill or odor may leak from the baggage deposited by the user, so that it may remain in the storage device. If the liquid or odor remains in the storage device, it may be transferred to the next baggage that will be deposited in the storage device. This predetermined event can be resolved at the predetermined location. The predetermined location may be, for example, a location where the storage device can be cleaned.

Here, when the predetermined event occurs in the storage device and it becomes necessary to move the vehicle to the predetermined location, if the distance to the predetermined location is long, it takes time to resolve the predetermined event. This may affect the deposit of the baggage and the pick-up of the baggage. In addition, in cases where the use of the storage device is restricted until the predetermined event is resolved, the profit will decrease due to the restriction on the use of the storage device.

On the other hand, if the route of the vehicle is generated in advance so that the vehicle passes through the predetermined area including the predetermined location where the predetermined event can be resolved, it will be possible for the vehicle to move to the predetermined location immediately when the predetermined event occurs. The predetermined area may be determined such that the time required for the vehicle to move or travel to the location where the predetermined event can be resolved when the predetermined event occurs is within an allowable range. On the other hand, if the vehicle takes a detour to pass through the predetermined area, it will result in an increase in the amount of power consumption or fuel consumption. Therefore, the predetermined area may be determined such that the travel cost falls within the acceptable range.

Hereinafter, embodiments of the present disclosure will be described based on the accompanying drawings. The configurations of the following embodiments are examples, and the present disclosure is not limited to the configurations of the embodiments. In addition, the following embodiments can be combined with one another as long as such combinations are possible and appropriate.

First Embodiment

FIG. 1 is a view illustrating a schematic configuration of a system 1 according to an embodiment. The system 1 is a system in which a user can store his or her baggage (luggage) or the like in a vehicle 10 with a locker 18 mounted thereon. By calling the vehicle 10 via a server 30, the user can deposit and pick up the baggage at any point. The vehicle 10 is, for example, a vehicle capable of driving autonomously, but may be a vehicle capable of being driven manually by a driver, or may be a vehicle on which a manager rides who monitors the vehicle 10 or the locker 18.

Figure 2:
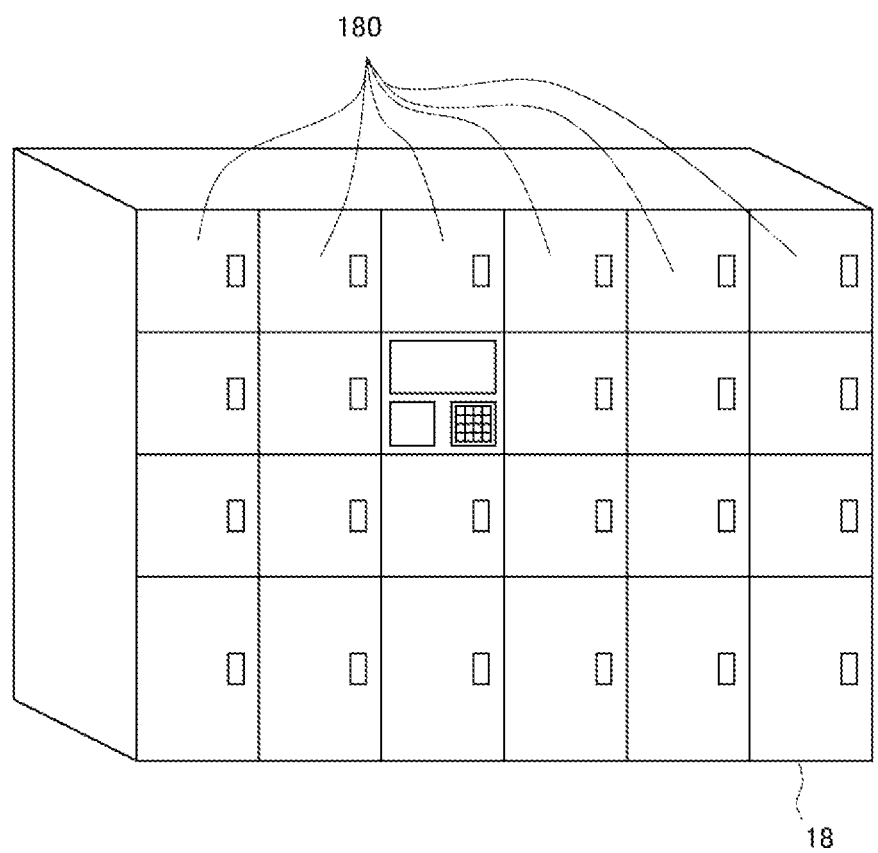
FIG. 2 is a view illustrating an appearance of a locker.

The locker 18 is a device that has a plurality of compartments, wherein baggage can be stored in each compartment. FIG. 2 illustrates the appearance of the locker 18. As illustrated, the locker 18 is configured so that the compartments, i.e., boxes 180, can be accessed by a plurality of doors, respectively. A user of the system 1 can perform an unlocking operation of a designated box 180 by using a user terminal 20 or via an interface provided in the locker 18. The locker 18 is mounted in a cabin of the vehicle 10. Note, that the locker 18 is an example of a storage device.

The user terminal 20 is a terminal that is carried by the user. The user can call the vehicle 10, and can lock and unlock the locker 18 by executing a predetermined application installed on the user terminal 20.

The server 30 is a device that manages the operation of vehicles 10. When receiving a dispatch request for a vehicle 10 from the user terminal 20, the server 30 determines a vehicle 10 to be dispatched to the user and instructs the vehicle 10 to operate. The server 30 generates a route for the vehicle 10 so that the vehicle 10 travels through a point where the user deposits the baggage and a point where the user picks up the baggage. The route is generated so as to pass through a predetermined area. The predetermined area is an area including a cleaning place (predetermined location) that is a place where the locker 18 can be cleaned. This route does not pass through the cleaning place but passes through the predetermined area relatively close to the cleaning place until the locker 18 gets dirty or damaged. Since the vehicle 10 travels on such a route, the vehicle 10 can be quickly moved to the cleaning place when dirt, damage or the like occurs to the locker 18 of the vehicle 10.

When the locker 18 gets dirty or damaged, the server 30 moves the vehicle 10 to the cleaning place so that a cleaning staff cleans the locker 18. As the cleaning place, there can be mentioned by way of example an automobile dealer, an automobile maintenance shop, a gas station, and a registered users home. At the cleaning place, the cleaning staff can unlock the box 180 to be cleaned by using a cleaning place terminal 40 or through an interface provided in the locker 18. The cleaning place terminal 40 is a terminal used by the cleaning staff at the cleaning place. The cleaning staff can perform the locking and unlocking of the locker 18 by executing a predetermined application installed in the cleaning place terminal 40. As the cleaning staff, there can be mentioned by way of example an employee of an automobile dealer, an employee of an automobile maintenance shop, an employee of a gas station, or a registered user.

The vehicle 10, the user terminal 20, the server 30, and the cleaning place terminal 40 are connected to one another by means of a network N1. The network N1 is, for example, a worldwide public communication network such as the Internet or the like, and a WAN (Wide Area Network) or other communication networks may be adopted. Also, the network N1 may include a telephone communication network such as a mobile phone network or the like, or a wireless communication network such as Wi-Fi (registered trademark) or the like. In addition, the locker 18 is connected to the user terminal 20 and the cleaning place terminal 40 via a network N2 including short-range wireless communication or the like. The network N2 performs data communication using, for example, Bluetooth (registered trademark) LowEnergy, NFC (Near Field Communication), UWB (Ultra Wideband), Wi-Fi (registered trademark), or the like.

Figure 3:
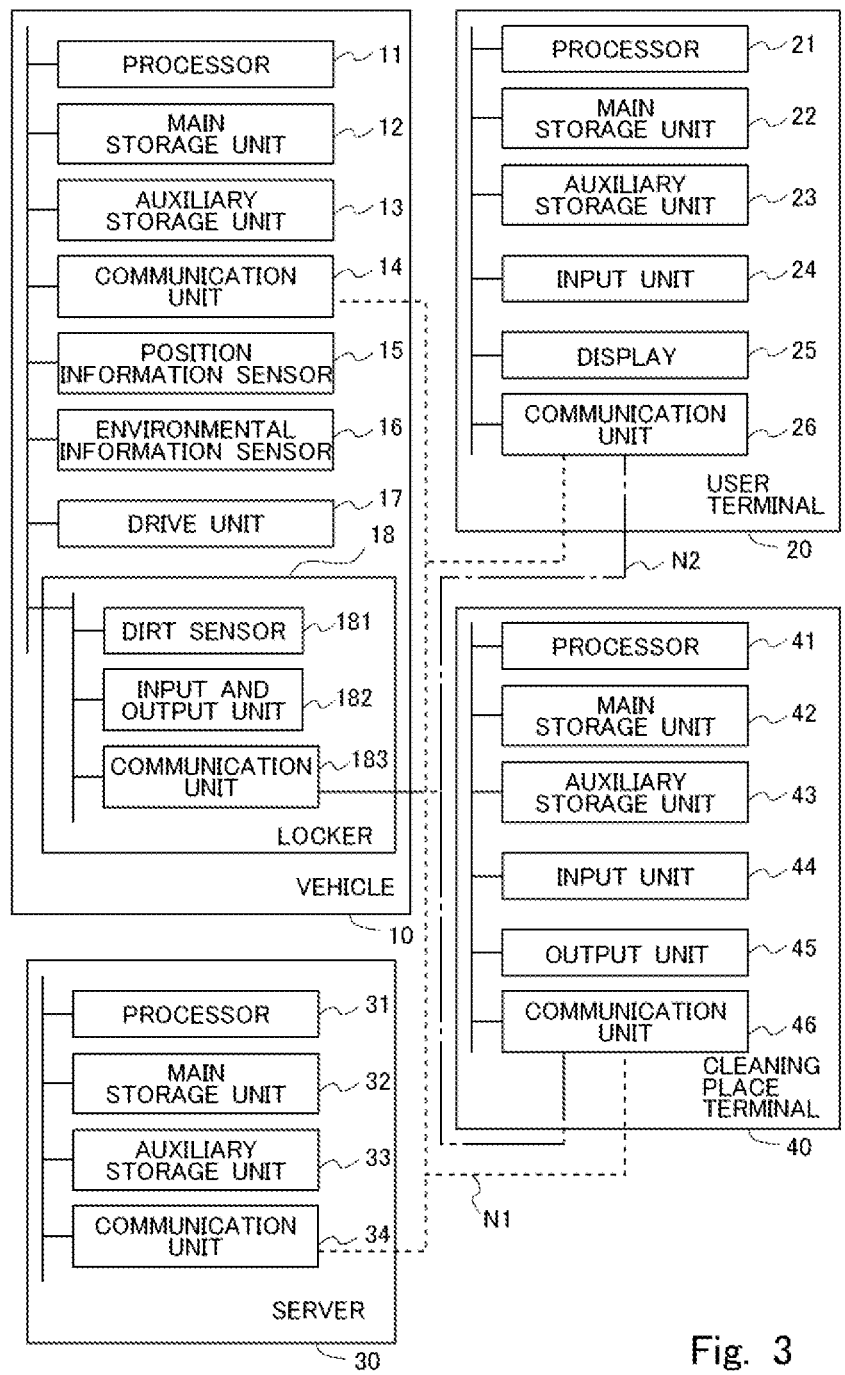
FIG. 3 is a block diagram schematically illustrating an example of a configuration of each of a vehicle, a user terminal, a server, and a cleaning place terminal, which together constitute the system according to the embodiment.

Hardware configurations and functional configurations of the vehicle 10, the user terminal 20, the server 30, and the cleaning place terminal 40 will be described based on FIG. 3. FIG. 3 is a block diagram schematically illustrating an example of a configuration of each of the vehicle 10, the user terminal 20, the server 30, and the cleaning place terminal 40, which together constitute the system 1 according to the present embodiment.

The server 30 has a configuration of a computer. The server 30 includes a processor 31, a main storage unit 32, an auxiliary storage unit 33, and a communication unit 34. These components are connected to one another by means of a bus. The processor 31 is an example of a controller. Also, the main storage unit 32 and the auxiliary storage unit 33 are examples of a storage unit.

The processor 31 is a CPU (Central Processing Unit), a DSP (Digital Signal Processor), or the like. The processor 31 controls the server 30 thereby to perform various information processing operations. The main storage unit 32 is a RAM (Random Access Memory), a ROM (Read Only Memory), or the like. The auxiliary storage unit 33 is an EPROM (Erasable Programmable ROM), a hard disk drive (HDD), a removable medium, or the like. The auxiliary storage unit 33 stores an operating system (OS), various programs, various tables, and the like. The processor 31 loads a program stored in the auxiliary storage unit 33 into a work area of the main storage unit 32 and executes the program, so that each component or the like is controlled through the execution of the program. As a result, the server 30 realizes functions that match predetermined purposes. The main storage unit 32 and the auxiliary storage unit 33 are computer readable recording media. Here, note that the server 30 may be a single computer or a plurality of computers that cooperate with one another. In addition, the information stored in the auxiliary storage unit 33 may be stored in the main storage unit 32. Also, the information stored in the main storage unit 32 may be stored in the auxiliary storage unit 33.

The communication unit 34 is a means or unit that communicates with the vehicle 10, the user terminal 20 and the cleaning place terminal 40 via the network N1. The communication unit 34 is, for example, a LAN (Local Area Network) interface board, a wireless communication circuit for wireless communication, or the like. The LAN interface board or the wireless communication circuit is connected to the network N1.

Next, the vehicle 10 is, for example, a moving object that is capable of autonomously traveling, and has a computer. The vehicle 10 includes a processor 11, a main storage unit 12, an auxiliary storage unit 13, a communication unit 14, a position information sensor 15, an environmental information sensor 16, a drive unit 17, and the locker 18. These components are connected to one another by means of a bus. The processor 11, the main storage unit 12, and the auxiliary storage unit 13 are the same as the processor 31, the main storage unit 32, and the auxiliary storage unit 33 of the server 30, respectively, and hence, the description thereof will be omitted.

The communication unit 14 is a communication means or unit for connecting the vehicle 10 to the network N1. The communication unit 14 is, for example, a circuit for communicating with other devices (e.g., the server 30 and the like) via the network N1 by making use of a mobile communication service (e.g., a telephone communication network such as 5G (5th Generation), 4G (4th Generation), 3G (3rd Generation), LTE (Long Term Evolution) or the like), and/or a wireless communication such as Wi-Fi (registered trademark), Bluetooth (registered trademark) or the like.

The position information sensor 15 obtains position information (e.g., latitude and longitude) of the vehicle 10 at a predetermined cycle. The position information sensor 15 is, for example, a GPS (Global Positioning System) receiver unit, a wireless communication unit or the like. The information obtained by the position information sensor 15 is recorded, for example, in the auxiliary storage unit 13 or the like and transmitted to the server 30.

The environmental information sensor 16 is a means or unit for sensing the state of the vehicle 10 or sensing the area around the vehicle 10. As a sensor for sensing the state of the vehicle 10, there is mentioned a gyro sensor, an acceleration sensor, an azimuth sensor, or the like. Also, as a sensor for sensing the area around the vehicle 10, there is mentioned a stereo camera, a laser scanner, a LIDAR, a radar, or the like.

The drive unit 17 is a device for driving the vehicle 10 based on control commands generated by the processor 11. The drive unit 17 is configured to include, for example, a plurality of motors or the like for driving rotors provided on the vehicle 10, so that the plurality of motors or the like are driven according to the control commands to realize autonomous driving of the vehicle 10.

The locker 18 is a device that keeps the baggage (luggage) of the user. The locker 18 has a plurality of boxes 180 for storing the baggage of users, and each box 180 is provided with a dirt sensor 181 for detecting odor or dirt inside. In addition, the locker 18 includes an input and output unit 182 and a communication unit 183. The dirt sensor 181, the input and output unit 182, and the communication unit 183 are connected to the processor 11 and the like in the vehicle 10 by means of a bus.

The dirt sensor 181 includes one or more of a sensor capable of detecting odor components, a sensor capable of detecting dirt, or a sensor capable of detecting liquid. The sensor capable of detecting odor components is, for example, an odor sensor capable of detecting the intensity of odor. In addition, the sensor capable of detecting dirt is, for example, a sensor equipped with a camera (image sensor), and is, for example, a sensor that detects the degree of dirt based on the image data captured. The sensor capable of detecting liquid is, for example, a liquid leakage sensor that detects liquid by detecting a change in transmittance or reflectance of light, or a liquid leakage sensor that detects liquid by detecting a change in electrical resistance, or the like. A plurality of these sensors can be used in combination. Note that, as an alternative, the dirt sensor 181 may be a sensor that detects when liquid is in a state where it can spill. For example, a gyro sensor may be employed as the dirt sensor 181, and it may be determined that liquid has been detected when the detection value of the gyro sensor has reached a value at which the liquid can spill.

The input and output unit 182 is a unit that receives an input operation performed by a user and presents information to the user. In the present embodiment, it is composed of a single touch panel display. In addition, the input and output unit 182 may also have a further means or unit for exchanging authentication information with the user terminal 20. For example, it may have a camera or the like for reading a two-dimensional bar code.

The communication unit 183 is a communication means or unit for connecting the locker 18 to the network N2. The communication unit 183 is a circuit for communicating with another device (e.g., the user terminal 20, the cleaning place terminal 40 or the like) via the network N2 by making use of a wireless communication network such as Bluetooth (registered trademark) LowEnergy, NFC (Near Field Communication), UWB (Ultra Wideband), Wi-Fi (registered trademark) or the like.

Now, the user terminal 20 will be described. The user terminal 20 is, for example, a smart phone, a mobile phone, a tablet terminal, a personal information terminal, a wearable computer (such as a smart watch or the like), or a small computer such as a personal computer (PC). The user terminal 20 includes a processor 21, a main storage unit 22, an auxiliary storage unit 23, an input unit 24, a display 25, and a communication unit 26. These components are connected to one another by means of a bus. The processor 21, the main storage unit 22 and the auxiliary storage unit 23 are the same as the processor 31, the main storage unit 32 and the auxiliary storage unit 33 of the server 30, respectively, and hence, the description thereof will be omitted.

The input unit 24 is a means or unit that receives an input operation performed by the user, and is, for example, a touch panel, a mouse, a keyboard, a push button, or the like. The display 25 is a means or unit for presenting information to the user, and is, for example, an LCD (Liquid Crystal Display), an EL (Electroluminescence) panel, or the like. The input unit 24 and the display 25 may be configured as a single touch panel display.

The communication unit 26 is a communication means or unit for connecting the user terminal 20 to the network N1 or the network N2. The communication unit 26 is a circuit for communicating with another device (e.g., the vehicle 10, the locker 18, the server 30, or the like) via the network N1 or the network N2 by making use of a mobile communication service (e.g., a telephone communication network such as 5G (5th Generation), 4G (4th Generation), 3G (3rd Generation), LTE (Long Term Evolution) or the like), and/or a wireless communication network such as Wi-Fi (registered trademark), Bluetooth (registered trademark) LowEnergy, NFC (Near Field Communication), UWB (Ultra Wideband) or the like.

Next, the cleaning place terminal 40 will be described. The cleaning place terminal 40 is, for example, a smart phone, a mobile phone, a tablet terminal, a personal information terminal, a wearable computer (such as a smart watch or the like), or a small computer such as a personal computer (PC). The cleaning place terminal 40 includes a processor 41, a main storage unit 42, an auxiliary storage unit 43, an input unit 44, a display 45, and a communication unit 46. These components are connected to one another by means of a bus. Note that the configurations of these components are the same as those of the processor 21, the main storage unit 22, the auxiliary storage unit 23, the input unit 24, the display 25, and the communication unit 26 of the user terminal 20, and thus description thereof will be omitted.

Figure 4:
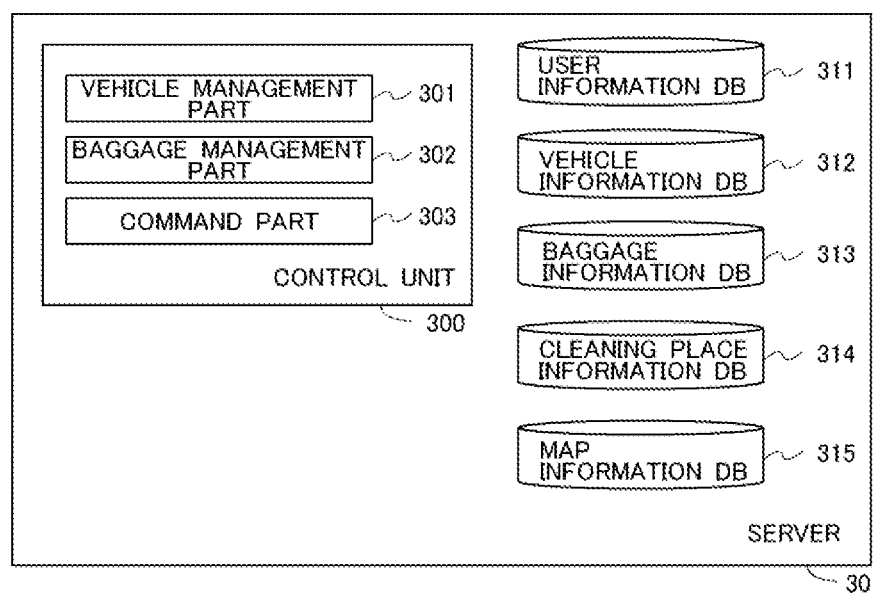
FIG. 4 is a diagram illustrating an example of a functional configuration of the server.

Now, the functions of the server 30 will be described. FIG. 4 is a diagram illustrating an example of a functional configuration of the server 30. The server 30 includes, as its functional components, a control unit 300, a user information DB 311, a vehicle information DB 312, a baggage information DB 313, a cleaning place information DB 314, and a map information DB 315. The processor 31 of the server 30 executes the processing of the control unit 300 by means of a computer program on the main storage unit 32. However, any of the individual functional components or a part of the processing thereof may be implemented by a hardware circuit. The control unit 300 includes a vehicle management part 301, a baggage management part 302 and a command part 303.

The user information DB 311, the vehicle information DB 312, the baggage information DB 313, the cleaning place information DB 314, and the map information DB 315 are built by a program of a database management system (DBMS) that is executed by the processor 31 to manage data stored in the auxiliary storage unit 33. The user information DB 311, the vehicle information DB 312, the baggage information DB 313, the cleaning place information DB 314, and the map information DB 315 are, for example, relational databases.

Here, note that any of the individual functional components of the server 30 or a part of the processing thereof may be executed by another or other computers connected to the network N1.

The vehicle management part 301 collects information about vehicles 10 and updates the vehicle information DB 312, which will be described later. To be specific, the vehicle management part 301 periodically communicates with a plurality of vehicles 10 and collects information about the vehicles 10 (hereinafter, also referred to as vehicle information). The information thus collected is reflected in the vehicle information DB 312 described later.

The baggage management part 302 obtains a deposit request from a user who wants to deposit his or her baggage. The deposit request is information for calling a vehicle 10 to deposit the baggage at a point desired by the user. The deposit request is transmitted from the user terminal 20 to the server 30. The deposit request includes information about the user ID, deposit point, deposit date and time, baggage size, and the like. The user ID is an identifier unique to the user. User information (e.g., name, address, telephone number, e-mail address, etc.) corresponding to the user ID may be registered in advance by the user using the user terminal 20, or may be transmitted from the user terminal 20 together with the deposit request. This user information has been stored in the user information DB 311. The user information DB 311 is formed by storing the user information in the auxiliary storage unit 33 described above, where the user and the user information are associated with each other. The deposit point is a point or location at which the user wants to deposit his or her baggage in the locker 18 of the vehicle 10, and is indicated, for example, by coordinates (latitude and longitude), an address, a name of a building, or the like. The deposit date and time is a date and time at which the user wants to deposit the baggage in the locker of the vehicle 10. Note that the deposit date and time may be designated as a time zone having a certain range.

In addition, the baggage management part 302 obtains a pick-up request from a user who wants to pick up his or her baggage. The pick-up request is information for calling the vehicle 10 carrying the baggage to a point desired by the user for the purpose of picking up the baggage. The pick-up request is transmitted from the user terminal 20 to the server 30. The pick-up request includes information about the user ID, the pick-up point, the pick-up date and time, and the like. The pick-up point is a point or location at which the user wants to pick up his or her baggage from the locker 18 of the vehicle 10, and is indicated, for example, by coordinates (latitude and longitude), an address, a name of a building, or the like. The pick-up date and time is a date and time at which the user wants to pick up the baggage from the locker 18 of the vehicle 10. Note that the pick-up date and time may be designated as a time zone with a certain range. In addition, the pick-up request may be transmitted from the user terminal 20 at the same time as the deposit request, or the pick-up request may be transmitted from the user terminal 20 after the deposit request.

The baggage management part 302 stores information included in the deposit request and information included in the pick-up request in the baggage information DB 313, which will be described later.

When receiving the deposit request or the pick-up request, the command part 303 determines a point or location at which the baggage is to be deposited or picked up (i.e., a point to which the vehicle 10 is to be dispatched; hereinafter, referred to as a dispatch point) and a date and time thereof (hereinafter, referred to as a dispatch date and time), and generates an operation command, which is a command for operating the vehicle 10. The operation command includes, for example, a route of the vehicle 10.

Moreover, the command part 303 generates the route of the vehicle 10 so as to pass through the predetermined area including the cleaning place. The predetermined area is, for example, an area within a predetermined distance from the cleaning place. The command part 303 generates a temporary route based on, for example, the deposit request and the pick-up request, and if the temporary route does not pass through the predetermined area, the command part 303 regenerates a new route so as to pass through the predetermined area. At this time, for example, the command part 303 may extract a cleaning place in which the distance between the temporary route and the predetermined area is the shortest, and may set a new route so that it passes through the predetermined area and has the shortest travel distance. Note that the route may be generated so that the predetermined area is located between the dispatch points, or the route may be generated so that the predetermined area is located for each of a plurality of dispatch points.

Further, in cases where there is no cleaning place near the temporary route, there is no need to force the generation of a route that passes through the predetermined area. For example, if the difference in travel distance between the new route and the temporary route is equal to or greater than a predetermined value, or if the difference in travel time between the new route and the temporary route is equal to or greater than a predetermined time, the new route passing through the predetermined area need not be adopted. The predetermined distance and the predetermined time referred to herein may be determined based on the cost or time allowed. Note that, instead of the difference in distance or time, the determination may be made based on the ratio of distance or time.

The command part 303 generates the route based on the map information stored in the map information DB 315. For example, the command part 303 generates an operation command so that the vehicle 10 departs from the current location, travels through each dispatch point at the dispatch date and time, and passes through the predetermined area on the way. In addition, the operation command includes a command to keep the baggage from the user or a command to deliver the baggage to the user, at each dispatch point.

For example, when receiving the deposit request from the user, the command part 303 selects a vehicle 10 that can be dispatched (hereinafter, also referred to as a dispatchable vehicle), based on information such as the deposit location, the deposit date and time, the size of the baggage included in the deposit request, and the like. The dispatchable vehicle 10 is a vehicle that has a vacant box 180 in which baggage of a corresponding size can be deposited, and that can be moved to the deposit point at the deposit date and time. For example, a vehicle that has a reservation for depositing or picking up baggage at another place at the same date and time does not correspond to the dispatchable vehicle 10 that can move to the deposit point are the deposit date and time. Therefore, the vehicle 10 is selected in consideration of dispatch points and dispatch dates and times corresponding to other baggage. Here, note that if there is no vehicle 10 that can be dispatched at the deposit date and time desired by the user, the user terminal 20 may be notified that the baggage cannot be deposited. At this time, the dates and times when the baggage can be deposited at the deposit point may be notified to the user terminal 20.

Here, note that in the above description, the deposit request includes the deposit date and time, but the present invention is not limited to this, and a deposit date and time may be presented to the user from the server 30. For example, when the server 30 obtains the deposit point, it may obtain a date and time at which the baggage can be deposited based on the reservation status of the box 180, and notify the user terminal 20 of the date and time at which the baggage can be deposited. When there is more than one date and time available for deposit, the user may be presented with multiple available deposit dates and times. In this way, the user may be able to select from among a plurality of available deposit dates and times. Similarly, the server 30 may present a deposit point to the user without including the deposit point in the deposit request. In addition, as an alternative, the server 30 may present a deposit point and a deposit date and time to the user.

Moreover, for example, when receiving the pick-up request from the user, the command part 303 selects a vehicle 10 to be dispatched based on the information such as the user ID, the pick-up point, the pick-up date and time, etc., included in the pick-up request. The vehicle 10 to be dispatched at this time is the vehicle in which the user has already deposited his or her baggage. Therefore, the vehicle 10 in which the user has already deposited the baggage is identified or specified based on the user ID. Then, based on the pick-up point and the pick-up date and time included in the pick-up request, the command part 303 determines whether or not the vehicle 10 can be dispatched to the pick-up point at the pick-up date and time. Note that in cases where the vehicle 10 cannot be dispatched at the pick-up date and time desired by the user, the user terminal 20 may be notified that the baggage cannot be delivered at the pick-up point at the pick-up date and time. At this time, the user terminal 20 may be notified of another date and time at which the baggage can be delivered at the pick-up point.

Here, note that in the above description, the pick-up date and time is included in the pick-up request, but the present invention is not limited to this, and the pick-up date and time may be presented to the user from the server 30. For example, when obtaining the pick-up point, the server 30 may obtain an available date and time at which the baggage can be picked up based on the reservation status of the box 180, and notify the user terminal 20 of the available date and time. When there are a plurality of dates and times available for pick-up, the plurality of available pick-up dates and times may be presented to the user. In this way, the user may be able to select from among the plurality of available pick-up dates and times. Similarly, the server 30 may present the pickup point to the user without including the pick-up point in the pick-up request. In addition, as an alternative, the server 30 may present the pick-up point and the pick-up date and time to the user.

Further, the baggage management part 302 obtains a detection value of the dirt sensor 181 from the vehicle 10. The detection value of the dirt sensor 181 is included in the vehicle information periodically transmitted from the vehicle 10, for example. Then, when the detection value of the dirt sensor 181 indicates that cleaning is required, a command is transmitted to the vehicle 10 to go to the cleaning place included in the next predetermined area to be passed. For example, the baggage management part 302 divides the detection values of the dirt sensor 181 into three dirt levels, and performs processing according to each level. For example, the three levels may be a first level where no cleaning is required, a second level where cleaning is required but the degree of dirt is low, and a third level where the degree of dirt is high. Note that the number of levels is not limited to three, but may be two or four or more.

In addition, the second level may be a level that requires only simple cleaning. The simple cleaning may be, for example, cleaning that can be completed in less than a predetermined amount of time, or cleaning with a household-level cleaning tool. On the other hand, when a predetermined amount of time or more is required for cleaning, the third level may be set. The third level may be a level that requires special cleaning. The special cleaning is cleaning using tools, chemicals or the like that are not found in ordinary households. Further, for example, when the detection value of the dirt sensor 181 is less than a first threshold value, it may be set as the first level; when it is equal to or greater than the first threshold value and less than a second threshold value, it may be set as the second level; and when it is equal to or greater than the second threshold value, it may be set as the third level. In other words, the dirt level may be set such that the larger the detection value of the dirt sensor 181, the longer the time required for cleaning.

Moreover, in a case where liquid is detected by the dirt sensor 181, the first threshold value and the second threshold value may be set such that this case corresponds to at least the second level or the third level. Also, the first threshold value may be set to a value at which the liquid does not flow out from the corresponding box 180, and the second threshold value may be set to a value at which the liquid may flow out from the corresponding box 180.

Further, in cases where dirt is detected by the dirt sensor 181, it may be determined that the dirt level is the third level if the dirt cannot be removed immediately. The type or degree of dirt may be determined, for example, by image processing.

The baggage management part 302 stores information about the dirt level corresponding to the box 180 in the baggage information DB 313, which will be described later.

Next, the configuration or structure of the vehicle information stored in the vehicle information DB 312 will be described based on FIG. 5. FIG. 5 is a view illustrating an example of a table configuration of the vehicle information DB 312. A vehicle information table has fields for vehicle ID, current location, status and route. In the vehicle ID field, information that can identify each vehicle (vehicle ID) is entered. A vehicle ID is assigned to each vehicle, for example, by the vehicle management part 301. In the current location field, information about the current position or location of each vehicle 10 (position information) is entered. The current location of each vehicle 10 is detected by the position information sensor 15 of the vehicle 10, and transmitted to the server 30.

In the status field, data representing the current state of each vehicle 10 is stored. Specifically, information about the remaining battery capacity of each vehicle 10 or the distance that each vehicle can travel is stored. In the route field, information about the route of each vehicle 10 is entered. A route passing through the predetermined area is stored in the route field. A temporary route that does not pass through the predetermined area may also be stored in the vehicle information DB 312.

Figure 6:
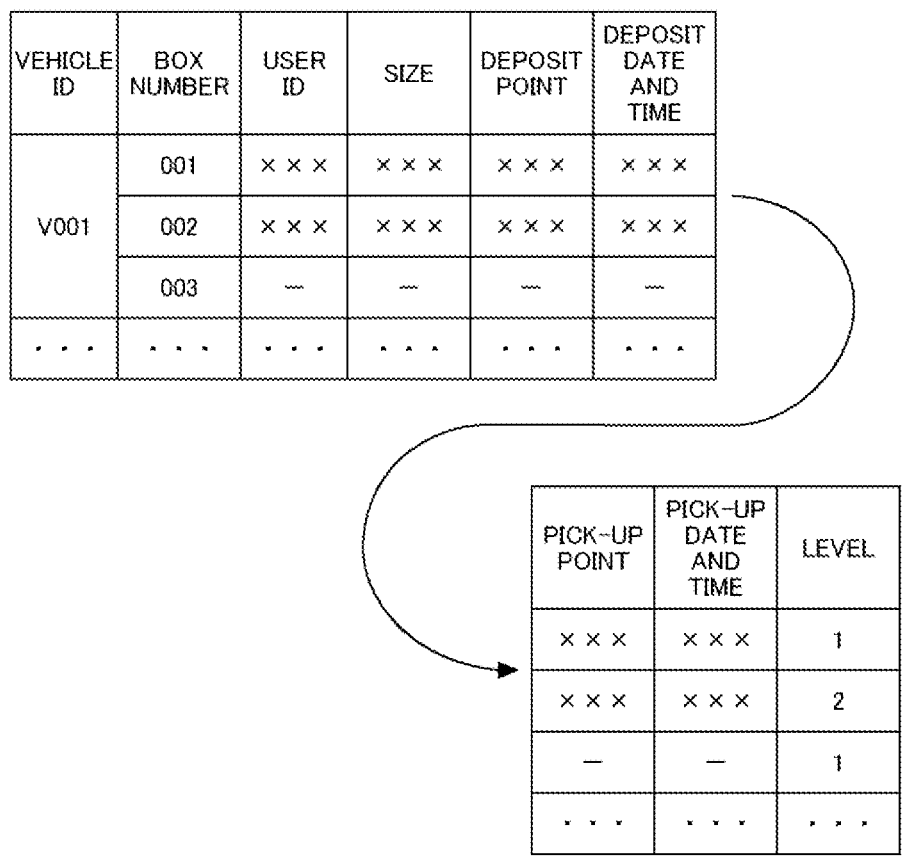
FIG. 6 is a view illustrating an example of a table configuration of a baggage information DB.

Then, the configuration of baggage information stored in the baggage information DB 313 will be described based on FIG. 6. FIG. 6 illustrates an example of a table configuration of the baggage information DB 313. A baggage information table has fields for vehicle ID, box number, user ID, size, deposit point, deposit date and time, pick-up point, pick-up date and time, and level. In the vehicle ID field, information that can identify each vehicle (vehicle ID) is entered. In the box number field, information that can identify each box 180 (box number) is entered. In the user ID field, information that can identify each user (user ID) is entered. In the size field, information about the size of baggage is entered. For example, the size may be indicated by the dimensions of length, width, and depth, or by predefined dimensions such as large, medium, and small.

In the deposit point field, information about a point where each user will deposit his or her baggage is entered. In the deposit point field, information is entered about a point that, when the user deposits the baggage in the locker 18 of the vehicle 10, can be a destination of the vehicle 10 such as, for example, coordinates, an address, a name of a building or the like. In the deposit date and time field, information about a date and time at which the user deposits the baggage is entered.

In the pick-up point field, information about a point where the user will pick up the baggage is entered. In the pick-up point field, information is entered about a point that, when the user picks up the baggage from the locker 18 of the vehicle 10, can be a destination of the vehicle 10 such as, for example, coordinates, an address, a name of a building or the like. In the pick-up date and time field, information about a date and time at which the user will pick up the baggage is entered.

In the level field, information about a dirt level is entered. For example, 1 is entered when the dirt level is the first level; 2 is entered when the dirt level is the second level; and 3 is entered when the dirt level is the third level.

Next, the configuration of cleaning place information stored in the cleaning place information DB 314 will be described based on FIG. 7. FIG. 7 is a view illustrating an example of a table configuration of the cleaning place information DB 314. A cleaning place information table has fields for cleaning place ID, location, available time, and available level. In the cleaning place ID field, information that can identify each cleaning place (cleaning place ID) is entered. A cleaning place ID is assigned to each cleaning place, for example, by the baggage management part 302. In the location field, information about the location of each cleaning place is entered. The location of each cleaning place is represented by coordinates or an address, for example. In the available time field, a day of the week and a time of the day when the cleaning of the vehicle 10 can be handled is entered. In the available level field, information about an available level is entered. For example, 2 is entered if the second level can be handled, and 3 is entered if the third level can be handled. Here, note that a cleaning place that can handle the third level may also be able to handle the second level. The information entered or input to the cleaning place information DB 314 is transmitted in advance from the cleaning place terminal 40 by a cleaning staff.

The map information DB 315 stores, as map information, for example, link data about roads (links), node data about node points, intersection data about each intersection, search data to search routes, facility data about facilities, search data to search points, etc. In addition, it may also store information about a speed limit or the like corresponding to each road or information about an attribute of each road.

Figure 8:
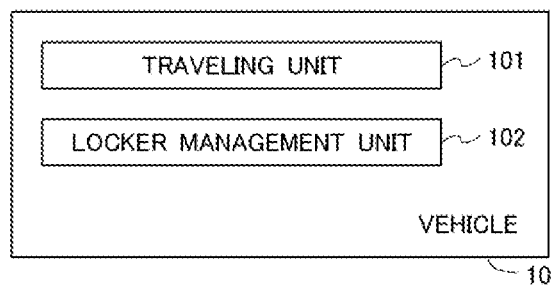
FIG. 8 is a diagram illustrating a functional configuration of the vehicle.

Now, the functions of the vehicle 10 will be described. FIG. 8 is a view illustrating a functional configuration of the vehicle 10. The vehicle 10 includes, as its functional components, a traveling unit 101 and a locker management unit 102. The processor 11 of the vehicle 10 executes the processing of the traveling unit 101 and the locker management unit 102 by a computer program on the main storage unit 12. However, any of the individual functional components or a part of the processing thereof may be implemented by a hardware circuit. Here, note that any of the individual functional components of the vehicle 10 or a part of the processing thereof may be executed by another or other computers connected to the network N1.

The traveling unit 101 controls traveling of the vehicle 10 during autonomous traveling of the vehicle 10. The traveling unit 101 generates control commands for controlling the drive unit 17 by using the data detected by the environmental information sensor 16. The traveling unit 101 controls, for example, the speed, the steering angle, and the like of the vehicle 10 by controlling a plurality of motors to generate a difference in the rotational speed of a plurality of rotors.

For example, the traveling unit 101 generates a travel trajectory of the vehicle 10 based on the data detected by the environmental information sensor 16, and controls the drive unit 17 so that the vehicle 10 travels along the travel trajectory. Here, note that as a method of causing the vehicle 10 to travel in an autonomous manner, there can be adopted a known method. The traveling unit 101 may perform feedback control based on the detection value of the environmental information sensor 16 during autonomous traveling. The traveling unit 101 controls the drive unit 17 so that the vehicle 10 autonomously travels around a predetermined route. This route is included in the operation command transmitted from the server 30.

For example, the traveling unit 101 causes the vehicle 10 to travel based on the travel route and the destination included in the operation command received from the server 30. When there is a deposit request or a pick-up request, the dispatch point becomes the destination. Then, the vehicle 10 is stopped at the dispatch point for the user to deposit or pick up the baggage.

In addition, the traveling unit 101 periodically transmits information about the vehicle 10 to the server 30. The traveling unit 101 transmits information about the current location obtained by the position information sensor 15 and the remaining battery capacity to the server 30 as information about the vehicle 10.

Moreover, the locker management unit 102 performs authentication of the user terminal 20 of a user who deposits or picks up the baggage, authentication of the cleaning place terminal 40 of a cleaning staff who performs cleaning, locking and unlocking of the box 180, and the like. The locker management unit 102 obtains the authentication information of the user terminal 20 or the cleaning place terminal 40 from the server 30 via the network N1. Further, the locker management unit 102 establishes communication with the user terminal 20 or the cleaning place terminal 40 via the network N2 to authenticate the user terminal 20 or the cleaning place terminal 40. For example, when the authentication information obtained from the server 30 matches the authentication information obtained from the user terminal 20 or the cleaning place terminal 40, the authentication of the user terminal 20 or the cleaning place terminal 40 is successful.

When the authentication of the user terminal 20 is successful, the locker management unit 102 unlocks and opens a box 180 corresponding to the size of the baggage entered by the user. Thereafter, when the user closes the door of the box 180, the box 180 is locked, and the server 30 is notified that the user has deposited the baggage. As an alternative, the user may be authenticated according to the information entered into the input and output unit 182 by the user. For example, when a password entered into the input and output unit 182 by the user matches a password obtained from the server 30, the authentication is successful. This password may be determined by the server 30. Alternatively, the password entered into the user terminal 20 by the user may be transmitted from the user terminal 20 to the server 30.

Similarly, in the case of picking up the baggage, the locker management unit 102 obtains the authentication information of the user terminal 20 from the server 30 via the network N1. Moreover, the locker management unit 102 establishes communication with the user terminal 20 via the network N2 to authenticate the user. For example, when the authentication information obtained from the server 30 matches the authentication information obtained from the user terminal 20, the authentication of the user is successful. When the authentication of the user is successful, the box 180 in which the user deposited the baggage is unlocked to open the door thereof. The box number of the box in which the user deposited the baggage may be obtained from the server 30. Alternatively, when the user deposits the baggage, the box number of the box in which the user has deposited the baggage may be stored in the auxiliary storage unit 13 of the vehicle 10.

In addition, when the authentication of the cleaning place terminal 40 is successful, the locker management unit 102 unlocks the box 180 requiring cleaning, and opens the door thereof. The box 180 requiring cleaning is instructed from the server 30. Thereafter, when the cleaning staff closes the door of the box 180, the box 180 is locked, and the completion of cleaning is notified to the server 30. Here, note that, as an alternative, the cleaning staff may be authenticated according to the information entered into the input and output unit 182 by the cleaning staff. For example, when a password entered into the input and output unit 182 by the cleaning staff matches a password obtained from the server 30, the authentication is successful. This password may be determined by the server 30. Alternatively, the password entered into the cleaning place terminal 40 by the cleaning staff may be transmitted from the cleaning place terminal 40 to the server 30.

Further, the locker management unit 102 periodically transmits the detection value of each dirt sensor 181 to the server 30 via the network N1.

Figure 9:
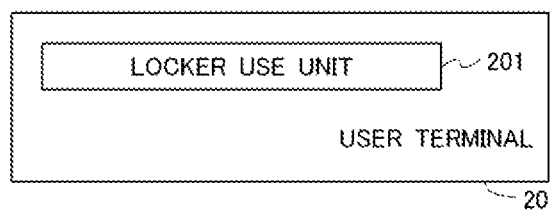
FIG. 9 is a diagram illustrating a functional configuration of the user terminal.

Next, the functions of the user terminal 20 will be described. FIG. 9 is a diagram illustrating a functional configuration of the user terminal 20. The user terminal 20 has a locker use unit 201 as its functional component. The processor 21 of the user terminal 20 executes the processing of the locker use unit 201 by a computer program on the main storage unit 22. However, a part of the processing of the locker use unit 201 may be executed by a hardware circuit. Note that a part of the processing of the locker use unit 201 may be executed by another computer connected to the network N1.

The locker use unit 201 generates a deposit request and a pick-up request according to an input to the input unit 24 of the user terminal 20. The locker use unit 201 displays a screen for using the locker 18 on the display 25. There, for example, buttons are displayed together with words "DEPOSIT" and "PICK-UP", respectively.

When the user taps the "DEPOSIT" button, the locker use unit 201 prompts the user to enter user information. Note that once the user information is entered, the information may be stored in the auxiliary storage unit 23, so that the user can then use the locker 18 only by entering a password, for example. The user enters or inputs a deposit point, a deposit date and time, an address, a name, a telephone number, an e-mail address, and the like through the input unit 24. Upon completion of the users input, the locker use unit 201 generates a deposit request and transmits it to the server 30 via the network N1.

On the other hand, when the user taps the "PICK-UP" button, the locker use unit 201 prompts the user to enter or input a pick-up point, a pick-up date and time, and the like. When the user completes these inputs through the input unit 24, the locker use unit 201 generates a pick-up request and transmits it to the server 30 via the network N1.

When the deposit request and the pick-up request are transmitted, information about the deposit or pick-up of the baggage may be transmitted from the server 30. For example, information indicating that the baggage can be deposited or picked up under the condition transmitted by the user terminal 20 or information indicating that the baggage cannot be deposited or picked up under the condition transmitted by the user terminal 20 is transmitted from the server 30. The locker use unit 201 displays a screen corresponding to the information on the display 25.

In addition, when the user deposits the baggage into the locker 18 or when the user picks up the baggage from the locker 18, the locker use unit 201 establishes communication with the communication unit 26 of the locker 18 and transmits information about the user to the locker 18. Therefore, the user terminal 20 is used as a key for unlocking the box 180 of the locker 18.

Figure 10:
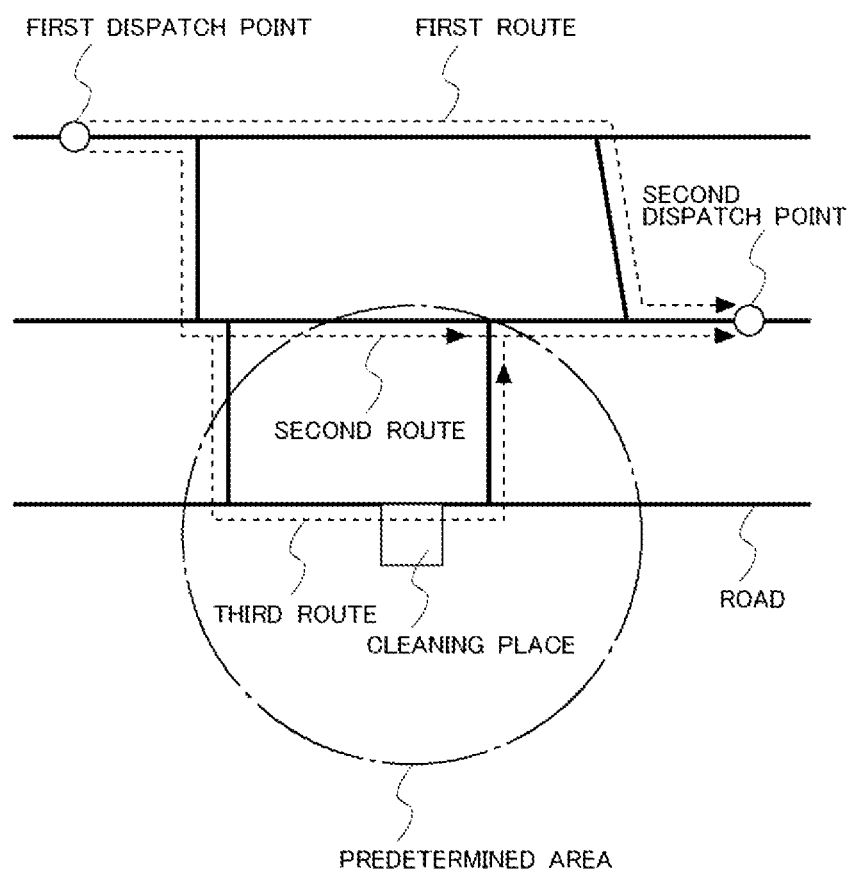
FIG. 10 is a view illustrating a route of the vehicle according to a first embodiment.

Here, FIG. 10 is a view illustrating a route of the vehicle 10 according to a first embodiment. FIG. 10 illustrates a case where the vehicle 10 moves or travels from a first dispatch point to a second dispatch point. The first dispatch point and the second dispatch point are a deposit point and a pick-up point, respectively. The first route is a route with the shortest travel distance. The second route is a route with the shortest travel distance among routes passing through a predetermined area. A third route is a route passing through a cleaning place. In the present embodiment, the second route is transmitted to the vehicle 10. That is, the first route with the shortest travel distance is not selected, but the second route passing through the predetermined area is selected. In addition, before dirt is detected by the dirt sensor, it is not necessary to select the third route passing through the cleaning place, but the third route may be selected. The wider the predetermined area, the shorter is the detour distance of the vehicle 10, but the longer is the distance to the cleaning place, so that, when dirt or damage occurs in the locker 18, the longer it takes to eliminate dirt or damage. The longer the time until the dirt or damage is eliminated, the longer will be the time during which baggage cannot be deposited in the locker 18. Therefore, an allowable value of the time required to eliminate the dirt or damage may be set in advance, and the predetermined area may be determined such that the time required to eliminate the dirt or damage is equal to or less than the allowable value. Further, the predetermined area may be determined such that the travel cost falls within an acceptable range.

Here, note that FIG. 10 illustrates a travel route from the first dispatch point to the second dispatch point, but instead of this, even in the case of generating a circular route with no destination or a route with a dispatch point determined in advance, a route passing through the predetermined area is similarly generated. For example, when a deposit request or a pick-up request is made while the vehicle 10 is traveling on a circular route with no destination, the command part 303 generates an operation command so that the vehicle 10 moves away from the circular route to the deposit point or the pick-up point. When generating such a route, the command part 303 transmits it to the vehicle 10, so that the vehicle 10 travels along the route received.

Further, in cases where the second level or the third level of dirt is detected at the first dispatch point, the command part 303 generates an operation command so that the vehicle 10 moves to a cleaning place. At this time, the cleaning place corresponding to the dirt level is selected.

Figure 11:
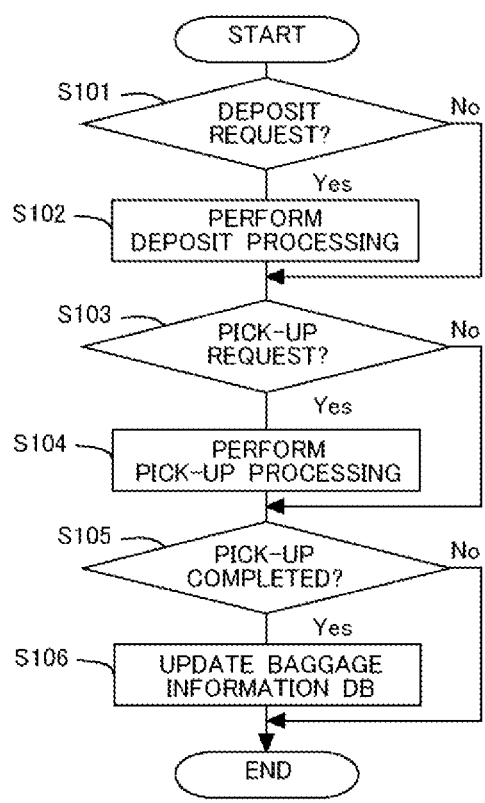
FIG. 11 is a flowchart of baggage deposit and pick-up processing at the server according to the first embodiment.

Then, baggage deposit processing at the server 30 will be described. FIG. 11 is a flowchart of baggage deposit and pick-up processing at the server 30 according to the first embodiment. The processing illustrated in FIG. 11 is executed at predetermined time intervals at the server 30. Note that the following description will be made on the assumption that the user information has been stored in advance in the user information DB 311.

In step S101, the baggage management part 302 determines whether or not a deposit request has been received from the user terminal 20. When an affirmative determination is made in step S101, the processing proceeds to step S102, whereas when a negative determination is made, the processing proceeds to step S103. In step S102, deposit processing is performed. The deposit processing will be described later.

In step S103, the baggage management part 302 determines whether or not a pick-up request has been received from the user terminal 20. When an affirmative determination is made in step S103, the processing proceeds to step S104, whereas when a negative determination is made, the processing proceeds to step S105. In step S104, pick-up processing is performed. The pick-up processing will be described later.

In step S105, the baggage management part 302 determines whether or not the pick-up of the baggage is completed. For example, when the pick-up of the baggage is completed, information including the vehicle ID, the box number, and the user ID is transmitted from the vehicle 10 to the server 30. Upon receipt of this information, the baggage management part 302 determines that the pick-up of the baggage is completed. When an affirmative determination is made in step S105, the processing or routine proceeds to step S106, whereas when a negative determination is made, this routine is ended. In step S106, the baggage management part 302 updates the baggage information DB 313. That is, the information about the user ID, the size of the baggage, the deposit point, the deposit date and time, the pick-up point, and the pick-up date and time corresponding to the vehicle ID and the box number is reset.

Figure 12:
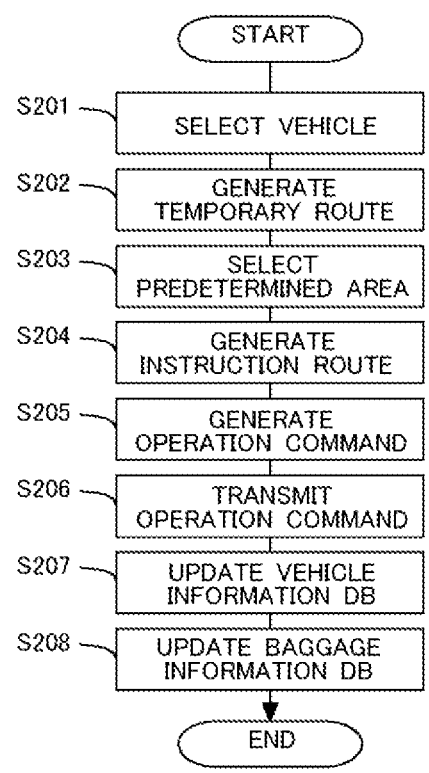
FIG. 12 is a flowchart of the deposit processing according to the first embodiment.

Next, the deposit processing executed in step S102 of FIG. 11 will be described. FIG. 12 is a flowchart of the deposit processing according to the first embodiment. In step S201, the command part 303 selects a vehicle 10 into which the baggage of the user is deposited. Based on the information included in the deposit request and the information stored in the baggage information DB 313, the command part 303 selects a vehicle 10 that is able to move to the deposit point at the deposit date and time and that has a vacant or available box 180 corresponding to the size of the users baggage. At this time, a box 180 for depositing the baggage is also selected.

In step S202, the command part 303 generates a temporary route so that the vehicle 10 departs from the current location and travels via the deposit point at the deposit date and time. For example, the command part 303 generates the temporary route so that the vehicle 10 moves in the shortest distance or the vehicle 10 moves in the shortest time.

In step S203, the command part 303 selects a predetermined area. For example, a predetermined area existing within a predetermined distance from the temporary route is selected. Here, note that a predetermined area corresponding to a cleaning place corresponding to the second level and a predetermined area corresponding to a cleaning place corresponding to the third level may be selected, respectively. In addition, a predetermined area corresponding to a cleaning place in which the locker can be cleaned between the current time and the deposit date and time is selected. This is determined based on the available time field of the cleaning place information DB 314. Moreover, if no predetermined area exists within the predetermined distance, it is not necessary to select any predetermined area. The predetermined distance referred to herein is determined in consideration of, for example, an increase in cost due to the detour of the vehicle 10 or a decrease in profit due to the unavailability of the locker 18. Further, the predetermined distance or the size of the predetermined area may be different depending on the dirt level or may be different depending on the area where the cleaning place is located.

In step S204, the command part 303 generates an instruction route in which the vehicle 10 departs from the current location and travels via the predetermined area and a stop point at the deposit date and time. For example, the command part 303 generates the instruction route so that the vehicle 10 moves in the shortest distance or the vehicle 10 moves in the shortest time, but the present invention is not limited to this. Any route may be used as long as it can reach the next dispatch point at the dispatch date and time.

In step S205, the command part 303 generates an operation command. The operation command includes the instruction route generated in step S204. In addition, the command part 303 generates the operation command so that the user terminal 20 is authenticated at the deposit point to keep the baggage from the user. Then, in step S206, the command part 303 transmits the operation command to the vehicle 10. Further, in step S207, the command part 303 updates the vehicle information DB 312. That is, the instruction route generated in step S204 is entered in the route field.

In step S208, the baggage management part 302 updates the baggage information DB 313. That is, the information about each of the user ID, the size of the baggage, the deposit point, and the deposit date and time is input to the baggage information DB 313, thereby updating the baggage information DB 313.

Figure 13:
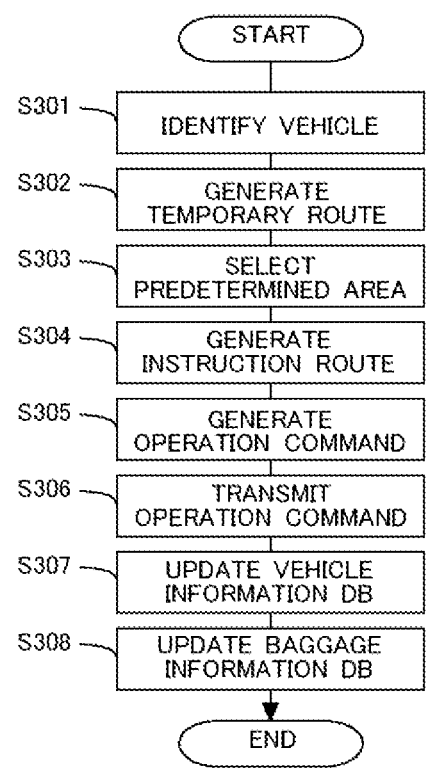
FIG. 13 is a flowchart of the pick-up processing according to the first embodiment.

Next, the deposit processing executed in step S104 of FIG. 11 will be described. FIG. 13 is a flowchart of the pick-up processing according to the first embodiment. In step S301, the command part 303 identifies the vehicle 10 in which the baggage of the user has been deposited. The command part 303 identifies the vehicle 10 in which the baggage with the matching user ID has been deposited, based on the information included in the pick-up request and the information stored in the baggage information DB 313.

In step S302, the command part 303 generates a temporary route so that the vehicle 10 departs from the current location and travels via the pick-up point at the pick-up date and time. For example, the command part 303 generates a temporary route so that the vehicle 10 moves in the shortest distance or the vehicle 10 moves in the shortest time.

In step S303, the command part 303 selects a predetermined area. For example, a predetermined area existing within a predetermined distance from the temporary route is selected. Here, note that a predetermined area corresponding to a cleaning place corresponding to the second level and a predetermined area corresponding to a cleaning place corresponding to the third level may be selected, respectively. In addition, if no predetermined area exists within the predetermined distance, it is not necessary to select any predetermined area. Moreover, a predetermined area corresponding to a cleaning place in which the locker can be cleaned between the current time and the deposit date and time is selected. This is determined based on the available time field of the cleaning place information DB 314. The predetermined distance referred to herein may be the same as or different from the predetermined distance described in step S203.

In step S304, the command part 303 generates an instruction route so that the vehicle 10 departs from the current location and travels via the predetermined area and the pick-up point at the pick-up date and time. For example, the command part 303 generates an instruction route so that the vehicle 10 moves in the shortest distance or the vehicle 10 moves in the shortest time.

In step S305, the command part 303 generates an operation command. The operation command includes the instruction route generated in step S304. In addition, the command part 303 generates the operation command so that the user terminal 20 is authenticated at the pick-up point to deliver the baggage to the user. Then, in step S306, the command part 303 transmits the operation command to the vehicle 10. Further, in step S307, the command part 303 updates the vehicle information DB 312. That is, the instruction route generated in step S304 is entered in the route field.

In step S308, the baggage management part 302 updates the baggage information DB 313. That is, the information about each of the user ID, the pick-up point, and the pick-up date and time is input to the baggage information DB 313, thereby updating the baggage information DB 313.

Figure 14:
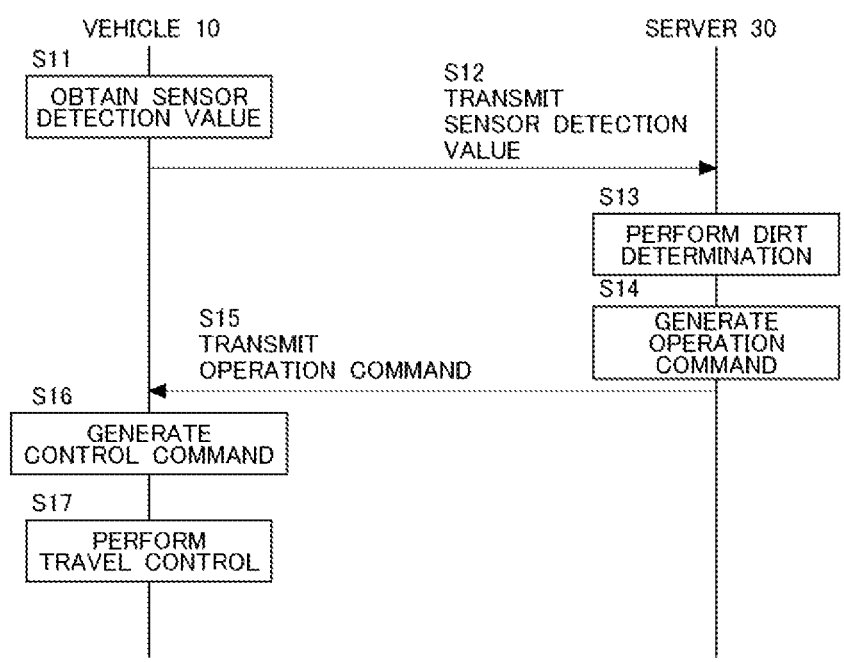
FIG. 14 is a sequence diagram of processing of the entire system when dirt or damage occurs in the locker.

Next, the processing of the entire system 1 when dirt or damage has occurred in the locker 18 will be described. FIG. 14 is a sequence diagram of the processing of the entire system 1 when dirt or damage has occurred in the locker 18. The vehicle 10 periodically obtains the detection value of each dirt sensor 181 (S11), and transmits it to the server 30 (S12). The server 30 determines, based on the detection value of each dirt sensor 181, whether or not dirt or damage has occurred (S13). For example, when the detection value of a dirt sensor 181 is equal to or greater than the first threshold value or the second threshold value, the server 30 determines that dirt or damage has occurred. When the server 30 determines the occurrence of dirt or damage, an operation command is generated at the server 30 that includes a route for the vehicle 10 to move to a cleaning place (S14). The operation command is transmitted from the server 30 to the vehicle 10 (S15).

The vehicle 10, which has received the operation command, generates a control command for controlling the drive unit 17 based on the operation command (S16). Then, the vehicle 10 performs travel control according to the control command (S17).

Figure 15:
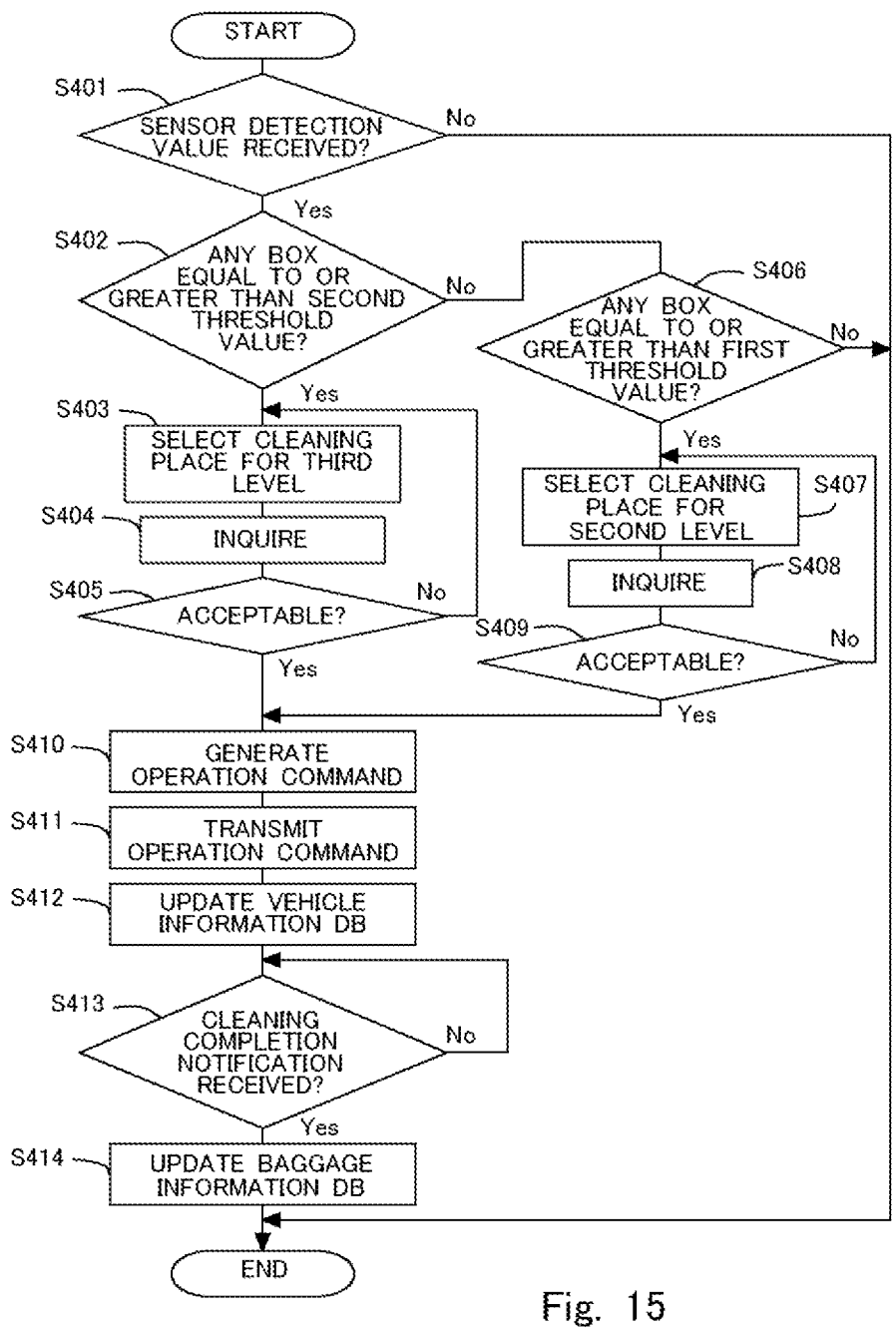
FIG. 15 is a flowchart of command generation processing according to the first embodiment.

Next, command generation processing in the server 30 in the case where dirt or damage is detected in the locker 18 will be described. FIG. 15 is a flowchart of the command generation processing according to the first embodiment. The command generation processing illustrated in FIG. 15 is executed at predetermined time intervals in the server 30. This routine is performed for each vehicle 10.

In step S401, the baggage management part 302 determines whether or not the detection value of each dirt sensor 181 corresponding to each box 180 has been received from the vehicle 10. When an affirmative determination is made in step S401, the processing proceeds to step S402, whereas when a negative determination is made, this routine is ended.

In step S402, the baggage management part 302 determines whether or not there is a box 180 for which the detection value of the dirt sensor 181 is equal to or greater than the second threshold value. In this step S402, the detection values of all the dirt sensors 181 are compared with the second threshold value, and those boxes 180 for which the detection values of the dirt sensors 181 are equal to or greater than the second threshold value are extracted. In addition, when there is a dirt sensor 181 for which the detection value of the box 180 is equal to or greater than the second threshold value, "3" indicating the third level is input to the level field of the baggage information DB 313. When an affirmative determination is made in step S402, the processing proceeds to step S403, whereas when a negative determination is made, the processing proceeds to step S406.

In step S403, the baggage management part 302 selects a cleaning place corresponding to the third level. The baggage management part 302 selects the cleaning place based on the route entered in the vehicle information DB 312. For example, the baggage management part 302 selects the cleaning place closest from the current location among the cleaning places that are included in the predetermined area through which the vehicle 10 is scheduled to pass and that correspond to the third level.

In step S404, the baggage management part 302 transmits an inquiry about acceptance to the cleaning place terminal 40 of the cleaning place selected in step S403. The baggage management part 302 generates an inquiry as to whether or not the vehicle 10 can be accepted, and transmits the inquiry to the cleaning place terminal 40 of the selected cleaning place. In step S405, the baggage management part 302 determines whether or not it has received a response that the vehicle 10 is acceptable. Here, note that in cases where there is no response from the cleaning place terminal 40 even after a predetermined period of time has elapsed, the processing may proceed on the assumption that a response indicating that acceptance is not possible has been received. When an affirmative determination is made in step S405, the processing proceeds to step S410, whereas when a negative determination is made, the processing returns to step S403, where another cleaning place is selected. The other cleaning place may be the cleaning place next closest from the vehicle 10. In this way, the processing is repeated until a response indicating that the vehicle 10 is acceptable is received from a cleaning place terminal 40. Note that the inquiry is not always necessary.

In step S406, the baggage management part 302 determines whether or not there is a box 180 for which the detection value of the dirt sensor 181 is equal to or greater than the first threshold value. In this step S406, the detection values of all the dirt sensors 181 are compared with the first threshold value, and those boxes 180 for which the detection values of the dirt sensors 181 are equal to or greater than the first threshold value are extracted. In addition, when there is a dirt sensor 181 for which the detection value of the box 180 is equal to or greater than the first threshold value, "2" indicating the second level is input to the level field of the baggage information DB 313. Then, when an affirmative determination is made in step S406, the processing proceeds to step S407. On the other hand, when a negative determination is made in step S406, there is no need for cleaning, and this routine is terminated.

In step S407, the baggage management part 302 selects a cleaning place corresponding to the second level. The baggage management part 302 selects the cleaning place based on the route entered in the vehicle information DB 312. For example, the baggage management part 302 selects the cleaning place closest from the current location among the cleaning places that are included in the predetermined area through which the vehicle 10 is scheduled to pass and that correspond to the second level.

In step S408, the baggage management part 302 transmits an inquiry about acceptance to the cleaning place terminal 40 of the cleaning place selected in step S407. The baggage management part 302 generates an inquiry as to whether or not the vehicle 10 can be accepted, and transmits the inquiry to the cleaning place terminal 40 of the selected cleaning place. In step S409, the baggage management part 302 determines whether or not it has received a response that the vehicle 10 is acceptable. Here, note that in cases where there is no response from the cleaning place terminal 40 even after a predetermined period of time has elapsed, the processing may proceed on the assumption that a response indicating that acceptance is not possible has been received. When an affirmative determination is made in step S409, the processing proceeds to step S410, whereas when a negative determination is made, the processing returns to step S407, where another cleaning place is selected. In this way, the processing is repeated until a response indicating that the vehicle 10 is acceptable is received from a cleaning place terminal 40. Note that the inquiry is not always necessary.

In step S410, the command part 303 generates an operation command. The operation command here is an operation command for traveling on the route via the cleaning place selected in step S403 or step S407. The operation command includes a route via the cleaning place selected in step S403 or step S407. The command part 303 generates this route and includes it in the operation command. In step S411, the command part 303 transmits the operation command to the vehicle 10. In addition, in step S412, the command part 303 updates the route field of the vehicle information DB 312.

In step S413, the command part 303 determines whether or not a cleaning completion notification has been received from the cleaning place terminal 40. The cleaning completion notification is a notification notifying that the cleaning of the locker 18 is completed, and is a notification that is transmitted to the cleaning place terminal 30 by the cleaning staff making a predetermined input to the server 40 when the cleaning is completed. When an affirmative determination is made in step S413, the processing proceeds to step S414, whereas when a negative determination is made, the processing of step S413 is executed again.

In step S414, the baggage management part 302 updates the baggage information DB 313. The baggage management part 302 enters 1 in the level field corresponding to the record of the box 180 that has been cleaned.

As described above, according to the first embodiment, since a route is generated in advance so that the vehicle 10 passes through the predetermined area including the cleaning place, it becomes possible for the vehicle 10 to quickly move to the cleaning place when dirt or damage occurs. Therefore, it is possible to quickly eliminate the dirt or damage, thereby making the locker available for use.

Second Embodiment

Figure 16:
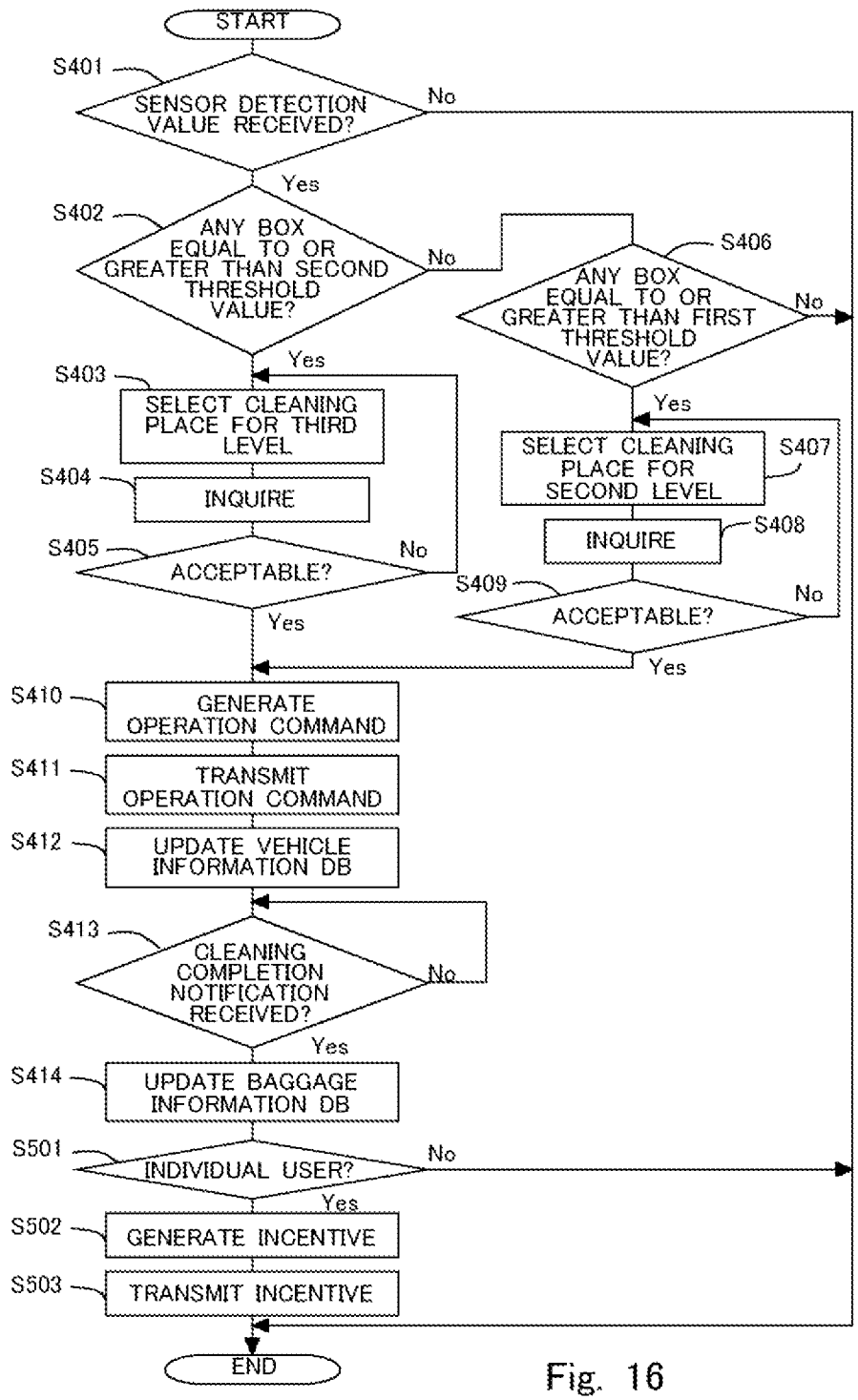
FIG. 16 is a flowchart of command generation processing in the case where an individual user performs cleaning according to a second embodiment.

In a second embodiment, an incentive is given when an individual user cleans the locker 18 at the cleaning place. FIG. 16 is a flowchart of command generation processing in the case where an individual user performs cleaning according to a second embodiment. The command generation processing illustrated in FIG. 16 is executed at predetermined time intervals in the server 30. This routine is performed for each vehicle 10. Since the steps up to step S414 are the same as those in the flowchart illustrated in FIG. 15, the same reference numerals are given to these steps, respectively, and the description thereof will be omitted.

In the routine illustrated in FIG. 16, when the processing of step S414 is completed, the processing or routine proceeds to step S501. In step S501, the command part 303 determines whether or not the user who performed the cleaning is an individual user. Information that can determine whether or not the user is an individual user is stored, for example, in the cleaning place information DB 314. For example, the cleaning place information DB 314 may be provided with a field for storing information indicating whether or not the user is an individual user. Alternatively, for example, cleaning place IDs may be different between individual users and other users. When an affirmative determination is made in step S501, the processing proceeds to step S502, whereas when a negative determination is made, this routine is ended.

In step S502, the command part 303 generates data representing an incentive. The incentive is, for example, a discount coupon for the usage fee of the locker 18 or electronic money. In step S503, the command part 303 transmits the data representing an incentive to the cleaning place terminal 40. The cleaning place terminal 40 is, for example, an individual smartphone or a personal computer.

As described above, according to the second embodiment, since an incentive is given when an individual user performs cleaning, it is possible to promote the individual user to clean the locker 18.

OTHER EMBODIMENTS

The above-described embodiments are merely examples, but the present disclosure can be implemented with appropriate modifications without departing from the spirit thereof.

The processing and/or means (devices, units, parts, etc.) described in the present disclosure can be freely combined and implemented as long as no technical contradiction occurs.

The processing described as being performed by one device or unit may be shared and performed by a plurality of devices or units. Alternatively, the processing described as being performed by different devices or units may be performed by one device or unit. In a computer system, a hardware configuration (server configuration) for realizing each function thereof can be changed in a flexible manner. For example, the server 30 may include a part of the functions of the vehicle 10. Also, for example, the vehicle 10 may include a part or all of the functions of the server 30.

The present disclosure can also be realized by supplying to a computer a computer program in which the functions described in the above-described embodiments are implemented, and reading out and executing the program by means of one or more processors included in the computer. Such a computer program may be provided to the computer by a non-transitory computer readable storage medium that can be connected to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, or any type of medium suitable for storing electronic commands or instructions.

What is claimed is:

1. An information processing apparatus including a controller configured to control a vehicle with a storage device mounted thereon in which a user is able to deposit baggage, wherein
the controller:
generates a route for the vehicle before an occurrence of a predetermined event so that the route passes through a deposit point of the baggage or a pick-up point of the baggage and a predetermined area, the predetermined area being different from and including a predetermined location where the storage device can be cleaned to resolve the predetermined event when the predetermined event related to dirt of the baggage deposited in the storage device occurs;
receives a detection value of a sensor from the vehicle, the sensor being included in the vehicle and being configured to detect dirt of the storage device;
determines whether the received detection value is equal to or greater than a predetermined threshold value;
determines that the predetermined event has occurred in a case where the received detection value is equal to or greater than the predetermined value;
in response to determining that the predetermined event has occurred, generates a command to the vehicle so as to change the route to pass through the predetermined location.

2. The information processing apparatus according to claim 1, wherein
the controller selects the predetermined location based on a time at which the predetermined location is able to resolve the predetermined event.

3. The information processing apparatus according to claim 1, further including a memory configured to store information about the predetermined location.

4. The information processing apparatus according to claim 1, wherein
when there are a plurality of predetermined locations, the controller selects the predetermined location to be passed through based on the predetermined event.

5. The information processing apparatus according to claim 1, wherein
the predetermined location is any one of an automobile dealer, an automobile maintenance factory, a gas station, and a home of a registered user.

6. The information processing apparatus according to claim 5, wherein
when the registered user resolves the predetermined event, the controller gives an incentive to the registered user.

7. An information processing method for controlling, by a computer, a vehicle with a storage device mounted thereon in which a user is able to deposit baggage, wherein
the computer:

generates a route for the vehicle before an occurrence of a predetermined event so that the route passes through a deposit point of the baggage or a pick-up point of the baggage and a predetermined area, the predetermined area being different from and including a predetermined location where the storage device can be cleaned to resolve the predetermined event when the predetermined event related to dirt of the baggage deposited in the storage device occurs;

receives a detection value of a sensor from the vehicle, the sensor being included in the vehicle and being configured to detect dirt of the storage device;

determines whether the received detection value is equal to or greater than a predetermined threshold value;

determines that the predetermined event has occurred in a case where the received detection value is equal to or greater than the predetermined value;

in response to determining that the predetermined event has occurred, generates a command to the vehicle so as to change the route to pass through the predetermined location.

8. The information processing method according to claim 7, wherein
the computer selects the predetermined location based on a time at which the predetermined location is able to resolve the predetermined event.

9. The information processing method according to claim 7, wherein
the computer obtains information about the predetermined location from a memory storing the information about the predetermined location.

10. The information processing method according to claim 7, wherein
when there are a plurality of predetermined locations, the computer selects the predetermined location to be passed through based on the predetermined event.

11. The information processing method according to claim 7, wherein
the predetermined location is any one of an automobile dealer, an automobile maintenance factory, a gas station, and a home of a registered user.

12. The information processing method according to claim 11, wherein
when the registered user has resolved the predetermined event, the computer gives an incentive to the registered user.

13. A non-transitory storage medium storing a program configured to control a vehicle with a storage device mounted thereon in which a user is able to deposit baggage, wherein the program causes a computer to:
generate a route for the vehicle before an occurrence of a predetermined event so that the route passes through a deposit point of the baggage or a pick-up point of the baggage and a predetermined area, the predetermined area being different from and including a predetermined location where the storage device can be cleaned to resolve the predetermined event when the predetermined event related to dirt of the baggage deposited in the storage device occurs;

receive a detection value of a sensor from the vehicle, the sensor being included in the vehicle and being configured to detect dirt of the storage device;

determine whether the received detection value is equal to or greater than a predetermined threshold value;

determine that the predetermined event has occurred in a case where the received detection value is equal to or greater than the predetermined value;

in response to determining that the predetermined event has occurred, generate a command to the vehicle so as to change the route to pass through the predetermined location.

14. The non-transitory storage medium storing a program according to claim 13, wherein
the program causes the computer to select the predetermined location based on a time at which the predetermined location is able to resolve the predetermined event.

15. The non-transitory storage medium storing a program according to claim 13, wherein
the program causes the computer to obtain information about the predetermined location from a memory storing the information about the predetermined location.

16. The non-transitory storage medium storing a program according to claim 13, wherein
when there are a plurality of predetermined locations, the program causes the computer to select the predetermined location to be passed through based on the predetermined event.

17. The non-transitory storage medium storing a program according to claim 13, wherein
the predetermined location is any one of an automobile dealer, an automobile maintenance factory, a gas station, and a home of a registered user.

18. The non-transitory storage medium storing a program according to claim 17, wherein
when the registered user resolves the predetermined event, the program causes the computer to give an incentive to the registered user.

* * * * *